(12) United States Patent
Weber et al.

(10) Patent No.: US 7,686,248 B2
(45) Date of Patent: Mar. 30, 2010

(54) SYSTEM AND METHOD FOR INTERNAL PASSIVE COOLING OF COMPOSITE STRUCTURES

(75) Inventors: Richard M. Weber, Prosper, TX (US); Kevin W. Chen, McKinney, TX (US); Michael M. Liggett, Allen, TX (US); Eric Krumin, Plano, TX (US); Gray E. Fowler, Allen, TX (US)

(73) Assignee: Raytheon Company, Waltham, MA (US)

( * ) Notice: Subject to any disclaimer, the term of this patent is extended or adjusted under 35 U.S.C. 154(b) by 915 days.

(21) Appl. No.: 11/230,972

(22) Filed: Sep. 20, 2005

(65) Prior Publication Data

US 2007/0221784 A1    Sep. 27, 2007

(51) Int. Cl.
*B64C 1/38* (2006.01)
(52) U.S. Cl. .................................. 244/117 A
(58) Field of Classification Search ............. 244/171.8, 244/117 A
See application file for complete search history.

(56) References Cited

U.S. PATENT DOCUMENTS

| | | | | | |
|---|---|---|---|---|---|
| 2,922,291 | A | * | 1/1960 | Fox et al. ....................... | 62/171 |
| 3,026,806 | A | * | 3/1962 | Runton et al. ............. | 244/159.1 |
| 3,517,730 | A | * | 6/1970 | Wyatt ......................... | 165/272 |
| 3,731,893 | A | * | 5/1973 | Stalmach, Jr. ............. | 244/171.8 |
| 3,785,591 | A | * | 1/1974 | Stalmach, Jr. ............. | 244/171.8 |
| 4,673,030 | A | * | 6/1987 | Basiulis ...................... | 165/272 |
| 2004/0188829 | A1 | * | 9/2004 | Hu et al. ..................... | 257/712 |

* cited by examiner

*Primary Examiner*—Tien Dinh
(74) *Attorney, Agent, or Firm*—Baker Botts L.L.P.

(57) ABSTRACT

According to one embodiment of the invention, an apparatus comprises a passive cooling system and a portion of an air vehicle which receives thermal energy. The passive cooling system is disposed adjacent the portion of the air vehicle and comprises a fluid transfer chamber. A fluid transfer element and a coolant are disposed within the fluid transfer chamber. The fluid transfer element wicks a portion of the coolant towards the portion of the air vehicle. The portion of the coolant wicked towards the portion of the air vehicle absorb at least a portion of the thermal energy in a boiling heat transfer.

13 Claims, 1 Drawing Sheet

SYSTEM AND METHOD FOR INTERNAL PASSIVE COOLING OF COMPOSITE STRUCTURES

TECHNICAL FIELD OF THE INVENTION

This invention relates generally to the field of air vehicles and, more particularly, to a system and method for internal passive cooling of composite structures.

BACKGROUND OF THE INVENTION

The use of a composite (e.g., organic polymer resin) in an air vehicle (e.g., aircraft or missile) control surface is desirable because the composite can provide adequate strength and stiffness at a lower weight than metals. However, the use of such composites is limited by the composite's maximum use temperature. For example, when a composite's resin glass transition temperature (Tg) is exceeded, the composite can char or burn, rapidly diminishing the properties of the composite and compromising the composite's structural integrity.

Current composites (e.g., organic polymer resins) are capable of surviving sustained use temperatures of up to about 650 F and can survive short exposure to much higher temperatures. However, as flight speeds of air vehicles continue to increase, the temperatures induced by air friction on the composite's control surface exceed the composite's Tg. Therefore, a conventional belief is that composites materials are not a viable option in high speed, high thermal loading environments.

SUMMARY OF THE INVENTION

According to one embodiment of the invention, an apparatus comprises a passive cooling system and a portion of an air vehicle which receives thermal energy. The passive cooling system is disposed adjacent the portion of the air vehicle and comprises a fluid transfer chamber. A fluid transfer element and a coolant are disposed within the fluid transfer chamber. The fluid transfer element wicks a portion of the coolant towards the portion of the air vehicle receiving the thermal energy. The portion of the coolant wicked towards the portion of the air vehicle absorbs at least a portion of the thermal energy in a boiling heat transfer.

Certain embodiments of the invention may provide numerous technical advantages. For example, a technical advantage of one embodiment may include the capability to reduce a thermal loading on a surface of an air vehicle. Other technical advantages of other embodiments may include the capability to enable the use of cost-effective, conventional composites in high speed, high thermal loading environments.

Although specific advantages have been enumerated above, various embodiments may include all, some, or none of the enumerated advantages. Additionally, other technical advantages may become readily apparent to one of ordinary skill in the art after review of the following figures and description.

BRIEF DESCRIPTION OF THE DRAWINGS

For a more complete understanding of example embodiments of the present invention and its advantages, reference is now made to the following description, taken in conjunction with the accompanying drawings, in which.

DETAILED DESCRIPTION OF EXAMPLE EMBODIMENTS OF THE INVENTION

It should be understood at the outset that although example embodiments of the present invention are illustrated below, the present invention may be implemented using any number of techniques, whether currently known or in existence. The present invention should in no way be limited to the example embodiments, drawings, and techniques illustrated below, including the embodiments and implementation illustrated and described herein. Additionally, the drawings are not necessarily drawn to scale.

As briefly referenced in the Background, the use of composites on a control surface of an air vehicle is desirable because the composite can provide adequate strength and stiffness at a lower weight than metals. Additionally, composites are generally cheaper than ceramics designed to sustain high thermal loading. However, the use of composites in a high speed, high thermal loading environment is prohibitive because the composite's resin glass transition temperature (Tg) can be exceeded, causing the composite structure to fail in certain circumstances. Accordingly, teachings of some embodiments of the invention recognize a thermal management system that reduces thermal energy buildup on surfaces of air vehicles, thereby allowing composites to be used in higher speed, higher thermal load flight regimes.

Figure 1:
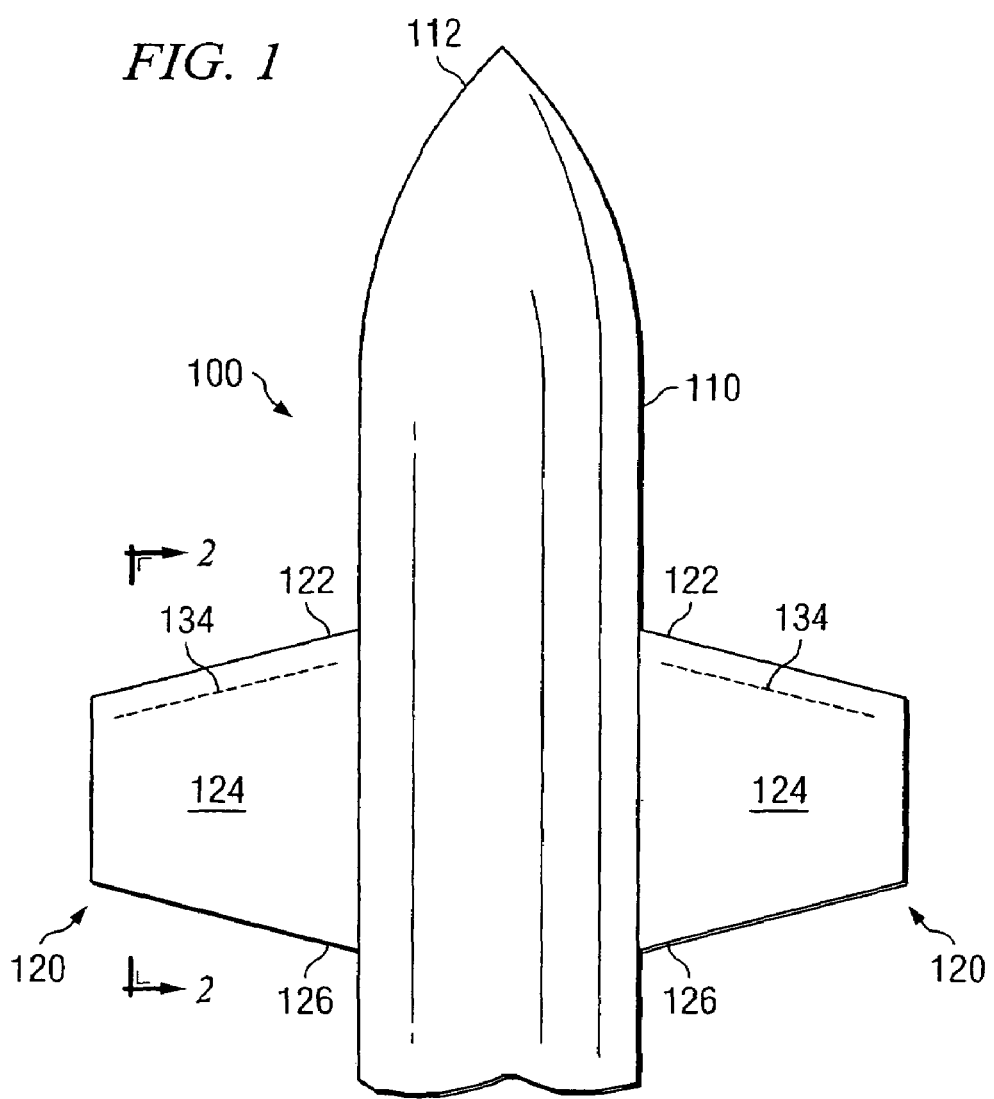
FIG. 1 is a top plan view of an air vehicle incorporating a thermal management system, according to an embodiment of the invention.
Figure 2:
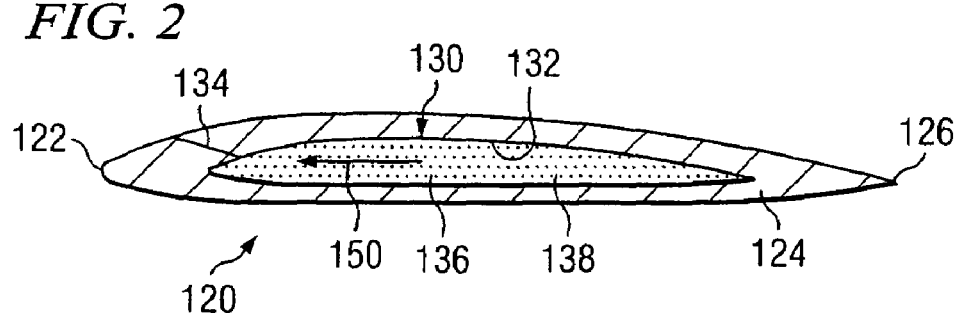
FIG. 2 is a cross-section taken along line 2-2 of FIG. 1, illustrating in more detail a thermal management system, according to an embodiment of the invention.

FIG. 1 is a top plan view and FIG. 2 is a cross-section of a portion of an air vehicle 100 incorporating a thermal management system 130, according to an embodiment of the invention. The air vehicle 100 may take on a variety of configurations, including but not limited to, missiles, airplanes, and other types of airborne vehicles. Although specific component parts of one embodiment of the air vehicle 100 will be described below, the air vehicle 100 in other embodiments may include more, fewer, or different component parts. In the illustrated embodiment of FIGS. 1 and 2, the air vehicle 100 is shown as a missile with a fuselage 100 and two wings 120.

When the air vehicle 100 takes flight and obtains high velocity speeds, thermal energy induced by air friction can generate on various portions of the air vehicle 100. For example, among other locations on the air vehicle 100, large amounts of thermal energy may generate at a tip 112 of the fuselage 110 and at leading edges 122 of the wings 120—areas that may be exposed to large amounts of air friction. The thermal management system 130, according to this embodiment is imbedded within the air vehicle 120 to dissipate at least a portion of this thermal energy, thereby facilitating a control of thermal energy on the surface of the air vehicle 100. With a control of thermal energy on the surface of the air vehicle 100, non-typical types of material can be used in the air vehicle 100, for example, materials that have lower resin glass transition temperatures (Tg). In other words, the thermal management system 130 in some embodiments helps prevent the surface of the air vehicle 100 from reaching a temperature at which certain materials could not operate (e.g., due to melting or charring), thereby permitting such materials (e.g., composites) to be used in high thermal loading flight regimes (e.g., hypersonic flight regimes). In other embodiments, the thermal management system 130 may simply reduce thermal loading on surfaces (e.g., metallic surfaces) to reduce negative impacts that may be caused by such thermal loading.

For purposes of brevity, the thermal management system 130 is only shown with reference to the wings 120. However, it should be expressly understood that that the embodiments of the thermal management system 130 disclosed herein may be utilized in other portions of the air vehicle 100, for example, the tip 112 of the fuselage 110 or other locations on the fuselage 110. Further, although the thermal management system 130 is generally described as dissipating thermal energy generated by air friction, the thermal management system 130 may also be used to dissipate thermal energy generated by other sources, for example, components (e.g., electronic components) that may be disposed within the air vehicle 100. Such components may include, but are not limited to, radio frequency (RF) transmission/reception equipment or other electronic devices.

As will be described in further details below, to facilitate a control of thermal energy, particular embodiments of the thermal management system 130 may use a passive cooling mechanisms to pump fluid to appropriate portions of the thermal management system 130. With such passive cooling mechanisms, in some embodiments there may be no control loop for the thermal management system 130, no control algorithm for the thermal management system 130, no monitoring of the thermal management system 130, no power required for the thermal management system 130, no electronics required for the thermal management system 130, and no maintenance required for the thermal management system 130. In other embodiments, the opposite of the preceding sentence may be the case (e.g., use of control loops, control algorithms, power, and electronics), for example, in embodiments that use an active cooling mechanism. In particular embodiments, the passive cooling mechanism or the active cooling mechanism may be imbedded within the wings 120 or within portions of the fuselage 110.

With reference to FIG. 2, a cross section of one of the wings 120 is shown. The wing 120 generally includes an outer structural portion, a composite lay-up 124, with an inner cooling system, the thermal management system 130, disposed therein. The composite lay-up 124 may be constructed of a variety of materials, including, but not limited to, fiber reinforced polymers. Further details of embodiments of construction of the composite lay-up 124 are described below.

The thermal management system 130 of this embodiment includes a fluid transfer chamber 132 with a fluid transfer material 136 disposed therein. In some embodiments, the fluid transfer chamber 132 of each wing 120 may be connected to one another while in other embodiments the fluid transfer chamber 132 of each wing 120 may be separate from one another. In particular embodiments, the fluid transfer chamber 132 may extend a substantial length of the wing 120 from the leading edge 122 to a trailing edge 126. In other embodiments, the fluid transfer chamber 132 may extend only a portion of a length of the wing 120.

The fluid transfer material 136 in particular embodiments may be a porous wicking material filled with coolant 138. In some embodiments, the air vehicle 100 may include a saturation device to selectively saturate the fluid transfer material 136 with the coolant 138 at a particular time. For example, such a saturation device may allow the coolant 138 to saturate the fluid transfer material 136 upon launch of the air vehicle 100. In other embodiments, the air vehicle 10 may not include a saturation device to selectively saturate the fluid transfer material 136 with the coolant 138.

The fluid transfer material 136 uses capillary action to enhance a distribution of the coolant 138 within the fluid transfer chamber 132. Using the capillary action of the fluid transfer material 136, the coolant 138 may be wicked from relatively liquid-rich areas within the fluid transfer material 136 towards relatively liquid-poor areas within the fluid transfer material 136. The fluid transfer material 136 may include any suitable material capable of providing this capillary action for the transfer of coolant 138. In particular embodiments, the fluid transfer material 136 may include a microporous material made of microporous aluminum, bronze, copper, and composite felts. In other embodiments, the fluid transfer material 136 may include other suitable types of wicking material.

Turning now in more detail to the coolant 138, one highly efficient technique for removing heat from a surface is to boil and vaporize a liquid which is in contact with a surface. As the liquid vaporizes in this process, it inherently absorbs heat or thermal energy to effectuate such vaporization. The amount of heat that can be absorbed per unit volume of a liquid is commonly known as the latent heat of vaporization of the liquid. The higher the latent heat of vaporization, the larger the amount of heat that can be absorbed per unit volume of liquid being vaporized. The coolant 138 in particular embodiments may be a two phase coolant which absorbs thermal energy to engage in boiling heat transfer to change from a liquid to a gas. In other embodiments, the coolant 138 may be a three phase coolant which initially absorbs thermal energy to melt from a solid to a liquid and then absorbs additional thermal energy to engage in boiling heat transfer to change the liquid to a gas. Both two phase coolants and three phase coolants will be described below.

Connected to the fluid transfer chamber 132 adjacent the leading edge 122 is one or more vents 134, which allow a release of vaporized coolant 138 from the fluid transfer chamber 132. The vents 134 in particular embodiments may allow a transfer of gaseous coolant 138 therethrough while preventing a transfer of liquid coolant 138 therethrough. In particular embodiments, the vents 134 may ultimately be exposed to ambient air. In other embodiment the vents 134 may be part of a closed-loop system in which the coolant 138 is retained in the air vehicle 100. Further details of both will be described below.

In operation and with reference to FIG. 2, the leading edge 122 of the wing 120 may begin to develop thermal energy. The temperature gradient between the leading edge 122 and the fluid transfer chamber 132 allows the thermal energy to transfer through the composite lay-up 124 to the fluid transfer chamber 132. Particular embodiments may include configurations to facilitate this transfer, including materials similar or different than the materials used for the composite lay-up 124.

Upon reaching the fluid transfer chamber 132, the thermal energy boils or vaporizes the coolant 138 in the fluid transfer material 136 that is adjacent the leading edge 122. The vaporized or gaseous coolant 138, containing at least a portion of the thermal energy imparted on the leading edge 122, may then exit the vent 134. As briefly referenced above, the vent 134 in particular embodiments may be exposed to ambient air. Accordingly, in such embodiments the coolant 138 (in vapor or gaseous form) may be transferred in an expendable manner to ambient air. In other embodiments in which the vents 134 are part of a closed-loop system, the vaporized coolant 138 may be retained on the air vehicle 100. Further details of this latter embodiment are described below.

As the coolant 138 vaporizes and exits the vents 134, the area adjacent the leading edge 122 becomes liquid-poor. Accordingly, the capillary action of the fluid transfer material 136 wicks coolant 138 (e.g., in liquid form) in the direction of arrow 150 towards the leading edge 122. In other words, the fluid transfer material 136 captures a liquid portion of the coolant 138 and passively pumps it to the areas that are liquid-poor, using the capillary action supplied by the fluid transfer material 136. Additionally, in particular embodiments, the capillary action of the fluid transfer material 136 assists in feeding the coolant 138 towards liquid-poor areas despite the air vehicle 100 being subjected to accelerations and adverse orientations. For example, in particular embodiments, the coolant 138 may be passively pumped against gravity or in the direction of acceleration toward liquid-poor areas.

As briefly referenced above, in particular embodiments, the coolant 138 may have two phases: liquid and gas. The coolant 138 may begin in the liquid state and vaporize upon receipt of thermal energy, for example, adjacent the leading edge 122. With this vaporization, the area adjacent the leading edge 122 becomes liquid-poor. Accordingly, the capillary action supplied by the fluid transfer material 136 begins transporting additional liquid coolant 138 in the direction of arrow 150 to the area adjacent the leading edge 122, whereupon the additional liquid coolant 138 is vaporized and the cycle continues. The coolant 138 used in two phase coolant embodiments may include, but is not limited to water, antifreeze, and mixtures of antifreeze and water. In particular embodiments, the antifreeze may be ethylene glycol, propylene glycol, methanol, or other suitable antifreeze. In other embodiments, the coolant 138 may include fluoroinert.

In other embodiments, the coolant 138 may have three phases: solid, liquid, and gas. In these embodiments, the coolant 138 may initially begin as a solid. Upon exposure to thermal energy, the coolant 138 may melt into a liquid state, whereupon the coolant 138 begins to act in a similar manner to the two phase coolant 138. The coolant 138 used in three phase embodiments may include, but is not limited to waxes such as paraffin wax or other suitable materials. In particular embodiments, the coolant 138 (whether two-phase coolant or three phase coolant) may absorb a substantial amount of heat as it melts and/or vaporizes, and thus may have a very high latent heat of vaporization.

As briefly referenced above, in particular embodiments, the coolant 138 upon exiting the vent 134 may be captured in a recovery system. In such an embodiment, the vent 134 may be connected to a loop which circulates the coolant 138, among other potential devices, to a condenser or heat exchanger to cool the vaporized coolant 138 sufficiently so that it condenses back into a liquid. To cool the liquid, a heat exchanger or the like may engage in a transfer of thermal energy to ambient air. As an example, a heat exchanger may be utilized at a location adjacent the trailing edge 126 to receive vaporized coolant 138 communicated from the vent 134. Upon transferring the thermal energy to ambient air, the coolant 138 may be condensed back to liquid for re-entrance into the fluid transfer chamber 132 at a location adjacent the trailing edge 126, whereupon the coolant 138 is recycled in the direction of the arrow 150 via the capillary action for re-vaporization. A loop such as this may be passively powered with the capillary action of the fluid transfer material 136. In other embodiments, the loop may be actively pumped.

In particular embodiments, the wing 120 and/or fuselage 110 may be constructed using a standard composite manufacturing process, including, but not limited to, resin transfer molding, prepreg molding, filament winding, fiber placement, resin film infusion, and compression molding. In these processes, in some embodiments the fluid transfer chamber 132 with the fluid transfer material 136 may be integrated as a component of the composite lay-up 24 process. As one example, needle pins may be pushed into the fluid transfer chamber 132 prior to deposition of the composite lay-up 124 on the chamber to establish the vents 134 (e.g., preventing the composite lay-up 124 from entering those areas). After deposition of the composite lay-up 124 on the fluid transfer chamber 132, the structure can be cured and the needle pins can be removed. The coolant 138 may be placed in the chamber 132 either prior or subsequent to the composite lay-up 24 deposition process. For example, in particular embodiments a solid coolant 138 may be disposed in the fluid transfer material 136 of the fluid transfer chamber 132 prior to depositing the composite lay-up 124 on the fluid transfer chamber 132. In other embodiments, the fluid transfer chamber 132 with the fluid transfer material 136 may be installed after the deposition process as a separate piece.

Although the present invention has been described with several embodiments, a myriad of changes, variations, alterations, transformations, and modifications may be suggested to one skilled in the art, and it is intended that the present invention encompass such changes, variations, alterations, transformation, and modifications as they fall within the scope of the appended claims.

What is claimed is:

1. An apparatus, comprising:
   a portion of an air vehicle which receives thermal energy;
   a passive cooling system disposed adjacent the portion of the air vehicle, the passive cooling system comprising a fluid transfer chamber; and
   a fluid transfer element and a three phase coolant disposed within the fluid transfer chamber, the fluid transfer element operable to transfer a portion of the three phase coolant in a liquid form towards the portion of the air vehicle, the three phase coolant operable to absorb at least a portion of the thermal energy to melt in the fluid transfer chamber from a solid to a liquid, the three phrase coolant further operable to absorb at least another portion of the thermal energy to vaporize in the fluid transfer chamber from a liquid to a vapor; and
   wherein the three phase coolant is a paraffin wax.

2. The apparatus of claim 1, wherein
   the air vehicle comprises a composite structure, and
   the portion of the air vehicle is a portion of the composite structure.

3. The apparatus of claim 2, wherein
   the composite structure is a wing,
   the portion of the air vehicle is a leading edge of the wing, and
   the passive cooling system is substantially contained within the wing.

4. The apparatus of claim 1, wherein
   the air vehicle is a missile operable to travel at supersonic speeds, and
   at least a portion of the thermal energy received on the portion of the missile is generated by air friction.

5. The apparatus of claim 1, wherein the passive cooling system further comprises a vent operable to receive vaporized coolant.

6. The apparatus of claim 5, wherein
   the vent is open to ambient air, and
   the vaporized coolant is expended to the ambient air.

7. The apparatus of claim 1, wherein the three phase coolant is in a solid state at a temperature of greater than 40 degrees Fahrenheit.

8. An apparatus, comprising:
   a portion of an air vehicle which receives thermal energy;
   a cooling system disposed adjacent the portion of the air vehicle, the cooling system comprising a fluid transfer chamber and a vent open to ambient air;

a three phase coolant disposed within the fluid transfer chamber, the cooling system transferring a portion of the three phase coolant in a liquid form towards the portion of the air vehicle, the three phase coolant operable to absorb at least a portion of the thermal energy to melt in the fluid transfer chamber from a solid to a liquid, the three phase coolant further operable to absorb at least another portion of the thermal energy to vaporize in the fluid transfer chamber from a liquid to a vapor, the vaporized coolant operable to be expended to the ambient air through the vent; and wherein the three phase coolant is a paraffin wax.

9. The apparatus of claim 8, wherein the cooling system is a passive cooling system, the fluid transfer chamber comprises a fluid transfer element, and the transfer of the portion of the cooling system towards the portion of air vehicle is through a capillary wicking.

10. The apparatus of claim 8, wherein the three phase coolant is in a solid state at a temperature of greater than 40 degrees Fahrenheit.

11. The apparatus of claim 8, wherein the air vehicle comprises a composite structure, and the portion of the air vehicle is a portion of the composite structure.

12. The apparatus of claim 5, wherein the composite structure is a wing, the portion of the air vehicle is a leading edge of the wing, and the cooling system is substantially contained within the wing.

13. The apparatus of claim 8, wherein the air vehicle is a missile operable to travel at supersonic speeds, and at least a portion of the thermal energy received on the portion of the missile is generated by air friction.

* * * * *

UNITED STATES PATENT AND TRADEMARK OFFICE
CERTIFICATE OF CORRECTION

| | | |
|---|---|---|
| PATENT NO. | : 7,686,248 B2 | Page 1 of 1 |
| APPLICATION NO. | : 11/230972 | |
| DATED | : March 30, 2010 | |
| INVENTOR(S) | : Richard M. Weber et al. | |

It is certified that error appears in the above-identified patent and that said Letters Patent is hereby corrected as shown below:

Column 8:
Claim 12, Line 8, delete "claim 5" and insert -- claim 11 --.

Signed and Sealed this
Eighth Day of November, 2011

David J. Kappos
*Director of the United States Patent and Trademark Office*